Dec. 17, 1963  W. H. RYMES  3,114,910
MOVING TARGET SIMULATORS
Filed Sept. 29, 1959  2 Sheets-Sheet 1

INVENTOR
WILLIAM H. RYMES
BY H. Vincent Harsha
ATTORNEY

Dec. 17, 1963

W. H. RYMES 3,114,910

MOVING TARGET SIMULATORS

Filed Sept. 29, 1959

INVENTOR
WILLIAM H. RYMES

BY

ATTORNEY

United States Patent Office 3,114,910
Patented Dec. 17, 1963

3,114,910
MOVING TARGET SIMULATORS
William H. Rymes, Burlington, Mass., assignor to
Raytheon Company, Lexington, Mass., a corporation of Delaware
Filed Sept. 29, 1959, Ser. No. 843,116
11 Claims. (Cl. 343—17.7)

This invention relates to testing systems and, more particularly, to target simulating systems for testing tracking apparatus in which the tracking is accomplished by employing directional receiving apparatus to follow a moving source of radiation which simulates a target.

In moving target simulating systems such as radar and sonar test sets, infrared tracking devices, and the like, it has been difficult, if not impossible, to provide for the high velocity movement of a simulated illuminated target in order to measure the tracking accuracy of a radar guidance or receiving system at angular rates which approach those generated by an actual target. This is particularly true when the target simulating system is required to provide a simulated illuminated target which moves in more than one direction and at high angular rates. In these instances, mechanical limitations, such as the weight of the moving source of radiation simulating the target, prevent the simulator from presenting a target which moves at constant rate of speed in both azimuth and elevation. It is therefore desirable to provide target simulation apparatus capable of moving an energy beam simulating a target in one direction and then reversing its direction of travel at a rapid and constant rate of speed without the inherent problems relating to mechanical limitations and momentum. For example, a conventional radar or guidance system employing a reflector approximately 32 inches in diameter requires a minimum angular testing distance of approximately 150 feet, as determined by its beam pattern and by the well-known minimum testing distance which is equal to $$\frac{2d^2}{\lambda}$$

where $d$ is the diameter of the reflector, and $\lambda$ is the wavelength of the reflected energy. At this testing distance the source of energy simulating a moving target is required to move in space at a speed of approximately 37.5 feet per second. Thus, an object of the invention is to provide this required movement in azimuth and elevation without the mechanical problems associated with rapidly accelerating or decelerating the target simulation apparatus.

In accordance with the target simulator of the invention, a source of radiation is beamed toward an ellipsoidal reflecting surface. The radiating source is mounted on gimbals or a movable mechanical mount adapted to direct the beam of energy from the near focal point of the ellipsoidal reflector to any selected area on the reflector surface. The radiating source comprises a movable directional radiator which is motor driven at predetermined speeds. In this manner, the beam is directed toward the surface of the reflector which redirects the beam to the device under test. This device or radar is positioned at the far focal point of the ellipsoidal reflector. The effect is to simulate an illuminated target relative to a point on the ellipsoidal reflector surface, whose angular position in space and rate of motion vary in accordance with the angular position and rate of motion of the radiating source. While the receiving device is usually positioned at the far focal point of the ellipsoidal reflector, it is possible to position the receiving antenna between the far focal point and the ellipsoidal reflector, this distance being determined in part by the width of the beam at the receiving point.

The beamwidth of the reflected energy is required to be sufficiently broad to illuminate the entire surface of the directional type of receiving antenna employed by the tracking equipment. Mounted on the directional radiator of the target simulator are azimuth and elevation synchro devices which form part of a well-known closed loop servo system used to position the directional radiator. These synchros can be monitored to determine the presence of dynamic error in the positioning loop. These position signals are fed to recording apparatus and compared with similar position signals generated in the radar tracking device. In addition, azimuth and elevation rate gyros produce signals which are compared with similar signals produced by the tracking equipment to determine angular tracking rate capability.

The invention further contemplates the provision of a parabolic reflecting surface, a portion of which is illuminated by a movable source of radiation, such as for example, an infrared radiation source positioned at the focal point of the parabola. The reflected energy from the parabolic reflector is directed toward a lens which redirects the parallel beams of energy reflected from the parabola into beams whose axes converge at a focal point assumed by the radar or tracking device to be tested. When the energy beam is moved to progressively illuminate selected areas of the parabola, the redirected energy, after passing through the converging lens or grating, arrives as a plane wave energy front at the device to be tested from selective portions of the converging lens and in this manner simulates a moving target.

Other objects and advantages of the invention will become more clearly apparent when taken in connection with the accompanying drawing, in which.

Figure 1:
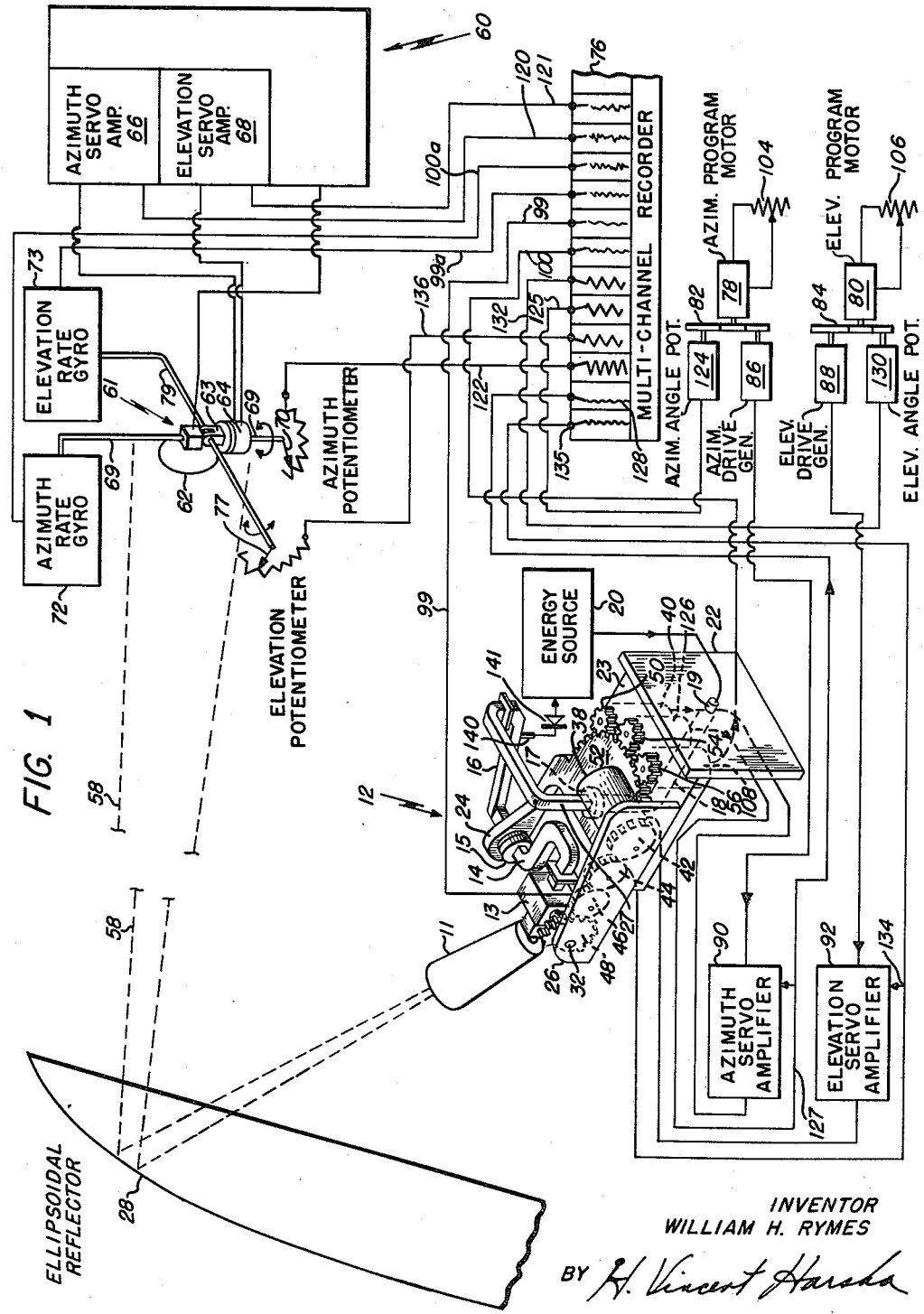
FIG. 1 is a diagrammatic view of an equipment setup which constitutes a schematic illustration of the invention.

Referring now to the particular system shown in FIG. 1, in connection with which the preferred embodiment of the present invention is disclosed, a radar directional horn 11 is mounted on an antenna drive assembly 12 and is capable of being rotated in azimuth about a vertical axis and in elevation about a horizontal axis. These rotational movements are effected by well-known servo mechanisms which are fed a control program from azimuth and elevation program motors at one end of the well-known servo loop, in a manner which will be described hereinafter.

Connected to horn 11 is a section of waveguide 14 which is fed through rotary joint 15 to a horizontal section of waveguide 16. A second rotary joint 17 permits motion of the horn about the vertical axis and transfer of energy from an accompanying section of waveguide 18. This latter section is coupled to a coaxial cable 19 which feeds energy from a transmitter or other energy source 20 into the horn 11.

The antenna drive assembly 12 comprises mounting plates 22 and 23, and includes a gimbal arm 24, which with mounting plate 26 support waveguide 14 by means of a collar 13. The horn 11 assumes a position wherein its longitudinal axis coincides with a selected area on the surface of an ellipsoidal reflector 28. The waveguide horn 11 is connected to the waveguide 14 and by means of supporting collar 13 is supported by gimbal arm 24 and mounting plate 26 for rotary scanning movement about the axis of a shaft 32. The antenna horn 11 is, in turn, operatively connected for rotation about the axis of a vertical waveguide section 27, which forms part of, and is connected to, the rotary joint 17, the axis of shaft 32 being normal to the axis of waveguide section 27 and rotary joint 17. Being so mounted, the radar horn 11 is capable of being rotated about the two intersecting axes spaced 90 degrees apart, and is thus capable of both a pitching movement about shaft 32 and a yawing movement about waveguide section 27, or a combination of both. The mechanism for imparting movement to the waveguide horn 11 comprises an elevation motor 38 and an azimuth motor 40.

The elevation motor 38 is coupled to shaft 32 by means of a motor gear 42 which drives synchro error gear 44, rate gyro gear 46, and elevation gear 48. In like manner, the azimuth motor 40 drives waveguide section 27 for rotation about the vertical axis by means of a motor gear 50 and azimuth shaft gear 52. As the azimuth shaft gear 52 rotates, it in turn drives an azimuth synchro error gear 54 and azimuth rate gyro gear 56. Connected to each of these gears are the corresponding synchro and rate gyros for transmitting scanning information to recording apparatus, the operation of which will be described in detail hereinafter.

Figure 3:
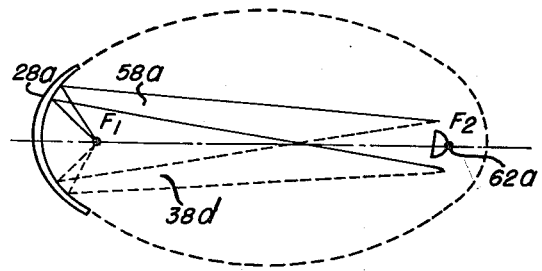
FIG. 3 is a schematic view serving to aid in the understanding of the invention.

The radio frequency energy emanating from horn 11 is directed to a predetermined area on the ellipsoidal reflector 28, which in turn redirects a beam of energy 58 in the direction of an automatic tracking radar 60 under test. An antenna 62 of the tracking radar under test is located at the far focal point of the ellipsoidal reflector 28. By way of explanation, FIG. 3 is a schematic diagram showing the two focal points, $F_1$ and $F_2$, an ellipsoidal reflector, 28a, the eccentricity of the reflector being determined by the test distance required for the particular equipment under test. In particular, FIG. 3 demonstrates energy being directed to produce beams 58a or 38d. These beams are emitted from $F_1$ and directed towards the ellipsoidal reflector, 28a, so as to pass through focus $F_2$ and illuminate antenna 62a regardless of the angular direction of emission of the beams with respect to the focus $F_1$. In the present instance, as shown in FIG. 1, the tracking radar antenna 62 is located some one-hundred feet from the ellipsoidal reflector 28 as noted by the broken beam 58, and is positioned entirely within this beam at the far focal point of the reflector. The antenna 62 of a radar antenna assembly 61 is fed tracking signals from the radar 60 and is positioned in elevation and azimuth by means of elevation gimbals 63 and azimuth gimbals 64, which form a rotary feed coupling in a manner similar to that described in connection with the antenna assembly 12.

The tracking radar 60 is provided with well-known azimuth and elevation servo amplifiers represented at 66 and 68, respectively, which drive azimuth and elevation servo motors, not shown, in the antenna assembly 61. Mechanically connected to the gimbals 64 by a shaft 69 is a radar azimuth indicator potentiometer 70 and a well-known azimuth rate gyro 72 which are adapted to translate mechanical motion into electrical signals. These latter signals are compared with corresponding signals from the target simulating apparatus. In like manner, elevation rate gyro 73 is connected to gimbals 63 and elevation potentiometer 77 by a mechanical coupling shaft 79. Electrical signals which are generated by the appropriate azimuth and elevation potentiometers and servos correspond to the tracking path generated by the radar antenna 62 in response to the moving beam 58 of reflected energy. These outputs are fed to their respective channels in a stylus-driven multi-channel recorder 76. In addition, the radar inputs to the azimuth servo amplifier 66 and elevation servo amplifier 68 are fed to corresponding channels on the multi-channel recorder to indicate radar azimuth and elevation dynamic lag, respectively. It should be understood that other data from the radar or guidance system under test can be simultaneously monitored by additional channels in the multi-channel recorder 60.

Referring now to the target simulator, generally, the output of an azimuth program motor 78 and elevation program motor 80 drive appropriate gear trains 82 and 84, respectively, which are connected to azimuth drive generator 86 and elevation drive generator 88. The electrical output of each of these drive generators is respectively connected to azimuth servo amplifier 90 and elevation servo amplifier 92. The electrical output of the azimuth servo amplifier 90 is connected to the servo motor 40, which mechanically drives motor gear 50. The elevation servo amplifier 92 is connected to elevation motor 38 adapted to mechanically drive motor gear 42. Connected to driven gear 46 is a rate gyro, not shown, which feeds by way of coupling cable 99 an electrical elevation rate signal into one input of the multi-channel recorder 76. This input signal represents the simulated elevation angular rate and is compared with the radar elevation angular rate, which is fed from a corresponding elevation rate gyro 73 in the tracking radar, by way of lead 99a, to the corresponding channel in the multi-channel recorder. In this manner, the angular rate of change of antenna position generated by the tracking radar is measured with respect to the corresponding angular rate of change of the simulated illuminated target as generated by the movement of horn 11. The trace drawn by the particular tracking stylus fed by the radar elevation angular rate signal is compared with the trace produced by the elevation angular rate signal of the simulator, and by this comparison the angular tracking capability of the tracking radar can be measured in a precise manner.

It should be understood that as the angular rate of the target simulator increases beyond the capability of the tracking radar, the tracking radar loses contact with the reflected signal and commences to track erratically. While this erratic tracking can provide a rough guide as to the capability of the tracking radar, minute tracking errors occurring before actual tracking failure can be ascertained and evaluated. Thus, a precise method of determining the tracking capability of a radar or similar tracking apparatus can be achieved at simulated rates of speed and angular velocity unobtainable heretofore.

In addition, a low reciprocating speed of the horn 11, approaching 15 revolutions per minute, permits rapid acceleration and deceleration of target motion so that the aforementioned angular checks can be performed at constant rates without sacrificing large portions of the tracking path for build-up to the desired speed.

Rate controls 104 and 106 are, respectively, connected to the azimuth and elevation program motors 78 and 80 in order to independently control maximum azimuth and elevation tracking rates. In order to determine the simulated azimuth angular rate, an azimuth rate gyro 108 is mechanically connected to azimuth rate gyro gear 56. The signal produced by the azimuth rate gyro 108 is fed to an input in the multi-channel recorder for comparison with the radar azimuth angular rate by means of leads 100 and 100a, respectively. In like manner, the input signals to the azimuth servo amplifier 66 and elevation servo amplifier 68, as generated in the automatic tracking radar 60, are fed as error signals to the recording stylii in the multi-channel recorder by way of leads 120 and 121. These error signals indicate in a well-known manner the dynamic lag of the radar tracking system. The azimuth potentiometer 70 produces a position signal which is represented by a trace produced by the stylus connected to lead 122 of the multi-channel recorder 76. The absence of an error signal on lead 120 from the azimuth servo amplifier 66 indicates that the automatic tracking radar is following the target without the aforementioned dynamic lag.

In the target simulator, the generated azimuth angle as determined by the azimuth program motor 78 is transmitted by an azimuth angle potentiometer 124 to a stylus connected to lead 125. The stylus inscribes a trace which represents the generated azimuth position of the simulator. The output of a synchro error control transformer 126 feeds a correction signal to the azimuth servo amplifier 90 by way of lead 127 and produces a trace 128 denoting the presence of a dynamic tracking error. In the absence of said error, no deflection of the trace 128 will appear. This indicates that the simulator is faithfully following the generated azimuth program. Assuming no error or a small error as shown by the deflections in trace 128, the precise position in azimuth of the simulated target is indicated by the degree of deflection of the stylus connected to lead 125. This defiection can then be directly compared with the deflection of the stylus connected to lead 122 from the radar azimuth potentiometer 70 to assess the ability of the tracking radar to follow the simulated target in azimuth. A similarity of traces, therefore, indicates that the tracking radar is accurately tracking the target in azimuth.

In a similar manner, the elevation potentiometer 77 produces a trace which is an accurate indication of the elevation tracking capability of the automatic tracking radar in absence of an error signal from the elevation servo amplifier 68. This trace is compared with the corresponding trace produced by the output of an elevation angle potentiometer 130 by way of lead 132. An elevation error signal generated by gear 44 connected to the associated elevation error control transformer, not shown, is fed to elevation servo amplifier 92 by way of lead 134 and to a stylus 135 to cause a deflection of the trace drawn by stylus 135. Assuming no error, or a negligible error as shown by a slight deflection of the trace drawn by stylus 135, the position in elevation of the simulated target is accurately indicated by the degree of deflection of the stylus connected to lead 132. This deflection is then directly compared with the deflection of the stylus connected to lead 136 from the radar elevation potentiometer 77 to permit an assessment of the ability of the tracking radar to follow the simulated target in elevation.

It should be understood that to simulate an illuminated radar target, the source of energy 20 in the target simulator is required to be pulsed by a trigger pulse generated in the radar 60. This trigger pulse can be fed from the radar 60 by a coaxial cable, not shown, connected from the tracking radar 60 to the energy source 20. Alternately, as is preferred, the tracking radar 60 transmits a pulse to the ellipsoidal reflector which is redirected to the radiating horn 11 in the simulator. This pulse energy enters waveguide section 16 where it is sampled by a waveguide probe 140 and detected by diode 141. The rectified output of diode 141 is then used to trigger or excite the energy source 20. This latter method of triggering permits the evaluation of transmitting characteristics as well as the angle tracking capabilities of a fully active radar system and simulates as closely as possible actual operational conditions. Also, undesirable delay caused by a lengthy trigger cable running from the radar 60 to the energy source 20 is eliminated.

Figure 2:
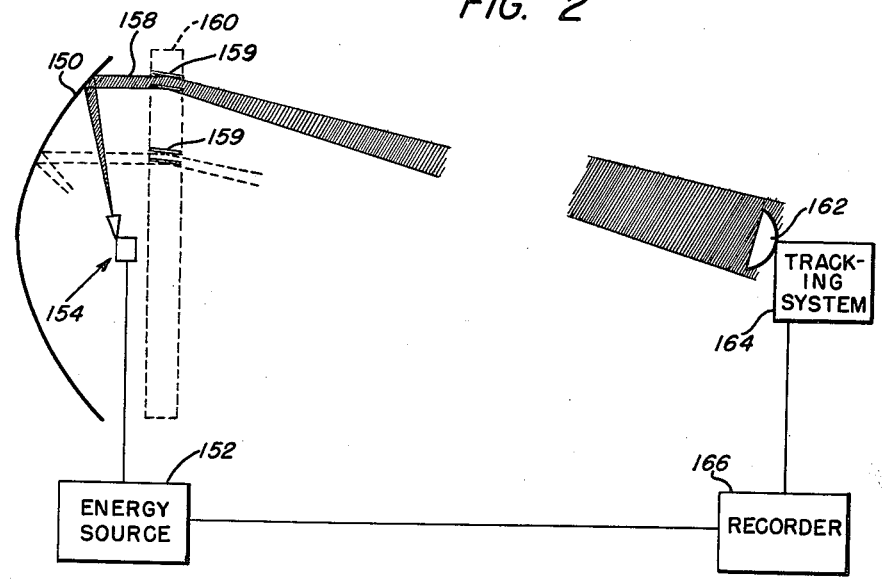
FIG. 2 is a schematic illustration of a second embodiment of the invention.

Referring now to FIG. 2, a second embodiment of the invention is shown which utilizes a parabolic reflector 150 in place of an ellipsoidal reflector. A source of energy 152, is transmitted to a radiating horn assembly 154 located at the focal point of the parabolic reflector. A selected area of the parabolic reflector is illuminated by the radiating horn. The energy illuminating this selected area of the parabola, in turn, is redirected in the form of a plane wave energy beam 158 to the deflecting surfaces 159 of a converging lens or grating 160. The converging lens in this embodiment is constructed in the form of a metallic grating having concentric deflecting surfaces constructed of approximately one-eighth inch aluminum supported by rods, not shown, so that the parallel rays from the parabola are deflected in a well-known manner. These rays illuminate an antenna 162 of a tracking system 164 under test. Thus, the parabola 150 and its associated lens or grating 160 are utilized as an alternate method of simulating a moving target. A recording device 166 is connected in a manner to compare the angular position and rate of travel of the simulated target in the target simulator with corresponding angular positions and rates generated by the guidance system 164. It should be understood that this device and the device shown in FIG. 1 are not limited to particular radar frequencies inasmuch as tracking devices utilizing infrared, sonar or other frequencies can be tested in a similar manner.

This completes the description of the particular embodiments of the invention illustrated herein. However, many modifications thereof will be apparent to persons skilled in the art without departing from the spirit and scope of this invention. Accordingly, it is desired that this invention not be limited by the particular details described herein, except as defined in the appended claims.

What is claimed is:

1. In combination, a reflector having a near and far focal point and an ellipsoidal surface adapted to reflect energy, means for directing energy from the near focal point of said reflector in the form of a beam toward said reflector, and means for moving said beam of energy to cause it to successively scan a series of positions on the surface of said reflector, to provide a moving plane wave energy beam, and a directional energy sensing device positioned in the region of the far focal point of said reflector.

2. In combination, a reflector having a near and far focal point and a surface adapted to reflect energy, means for directing energy from the near focal point of said reflector in the form of a beam toward a selected area of said reflector, and means for simulating a continuously moving target including means for moving said beam of energy at said near focal point to cause it to redirect energy in the form of a plane wave energy beam through the far focal point of said reflector.

3. In combination, a reflector having a near and far focal point and a surface adapted to reflect energy, means for directing energy from the near focal point of said reflector in the form of a beam toward said reflector, and means for moving said beam of energy to cause it to successively scan a series of positions on the surface of said reflector to provide a continuously moving source of illumination, and a directional sensing device positioned at the far focal point of said reflector.

4. In combination, a reflector having an ellipsoidal surface adapted to reflect energy, means for directing energy from the near focal point of said reflector in the form of a beam to illuminate a portion of said reflector, means for moving said beam of energy to cause it to successively scan a series of areas on the surface of said reflector according to a prearranged program, thereby to simulate a moving target, and means positioned in the region of the far focal point of said reflector for receiving and tracking the moving beam of energy reflected from said ellipsoidal reflector.

5. In combination, a reflector having an ellipsoidal surface adapted to reflect energy, means for directing energy in the form of a beam toward a finite area on the surface of said reflector, means for moving said beam of energy to cause it to successively scan a series of said areas on the surface of said reflector according to a program, thereby to simulate a moving target, means for receiving and tracking the moving beam of energy reflected from said reflector, and means for comparing the tracking path generated by said receiving and tracking means with said program.

6. A target simulator device for testing the tracking capability of a tracking device as used in radar systems comprising a reflector having an ellipsoidal surface adapted to reflect energy, means for directing energy in the form of a beam toward said reflector, means for moving said beam of energy to cause it to successively scan a series of areas on the surface of said reflector, thereby to simulate an illuminated target, and means for comparing the tracking path generated by said illuminated target with the tracking path generated by the tracking device adapted to be tested.

7. A target simulating system comprising an energy transmitter having a directional antenna, the direction of which can be varied to scan a zone in space, an ellipsoidal reflector having a near and far focal point positioned in the path of said energy to reflect said energy arriving from the near focal point of said reflector in a predetermined direction, driving means for varying the position of said directional antenna according to a prearranged program, and a receiver positioned in the region of the far focal point of said horizontal reflector having an antenna adapted to track the moving beam of energy reflected from said ellipsoidal reflector.

8. A moving target simulator comprising a reflector having an ellipsoidal surface adapted to reflect electromagnetic energy, means for directing electromagnetic energy in the form of a beam toward said reflector from the focal point of said reflector, means for moving said beam of electromagnetic energy to cause it to scan a series of positions on the surface of said reflector in a cyclic manner, thereby to simulate a moving target, means for receiving and tracking the moving beam of electromagnetic energy reflected from said reflector, said latter recited means located adjacent to the far focal point of the ellipsoidal reflector, and reference means for comparing the tracking path generated by said receiving and tracking means with the cyclic movement of said beam of electromagnetic energy.

9. A measuring system comprising a radiant energy transmitter having a directional antenna adapted to direct a beam of radiant energy, the direction of which can be varied to scan a zone in space, an ellipsoidal reflector positioned in the path scanned by said radiant energy and adapted to reflect said radiant energy in a predetermined direction, driving means for varying the position of said directive antenna according to a prearranged program, a receiver having an antenna adapted to track the moving beam of energy reflected from said ellipsoidal reflector, a reference generator coupled to each of said antennas to provide an output in response to the direction of movement of each of said antennas, and recording apparatus connected to the output of each reference generator for comparing the tracking path generated by said latter recited antenna with the programmed variation of said radiant energy reflected from said ellipsoidal reflector.

10. In combination, a measuring system comprising a radiant energy transmitter having a directive antenna, the directivity of which can be varied to scan a zone in space, an ellipsoidal reflector positioned in the path of said radiant energy to reflect said energy in a predetermined direction, receiving apparatus having an antenna positioned adjacent to the far focal point of said ellipsoidal reflector, said antenna adapted to track the beam of reflected energy, and apparatus for comparing the tracking path generated by said latter recited apparatus with the scanning movement of said beam of radiant energy reflected from said reflector.

11. Target simulating apparatus for testing an electrical tracking system comprising a tracking antenna for said system, a receiver connected to said tracking antenna, a radiant energy transmitter having a directional antenna spaced from said tracking antenna, said directional antenna having a beam forming element adapted to direct a narrow beam of radiant energy at a selected position on the surface of said ellipsoidal reflector, an antenna driving device for moving said beam forming element along a predetermined path, thereby to reflect in the direction of said tracking antenna a beam simulating an illuminated target, said tracking antenna and said directional antenna each having a reference generator for translating the movement of each of said antennas into an electrical output, and a recording device connected to the electrical output of each reference generator for comparing the tracking path generated by said tracking antenna with the movement of said beam reflected from said directional antenna.

References Cited in the file of this patent

UNITED STATES PATENTS

| | | |
|---|---|---|
| 2,419,556 | Feldman | Apr. 29, 1947 |
| 2,448,365 | Gillespie | Aug. 31, 1948 |
| 2,643,339 | Lan Jen Chu | June 23, 1953 |
| 2,946,049 | Stotz | July 19, 1960 |

OTHER REFERENCES

Kraus: "Antennas," published by McGraw-Hill Book Co., 1950, pp. 324–325.